(12) United States Patent
Rawlings et al.

(10) Patent No.: US 10,209,146 B1
(45) Date of Patent: Feb. 19, 2019

(54) APPARATUS AND PROCESS FOR DETERMINING A CONVECTIVE HEAT TRANSFER COEFFICIENT BETWEEN A MOVING FLUID AND A BOUNDING SURFACE

(71) Applicants: Christopher K Rawlings, Stuart, FL (US); Phillip M Redman, Pompano Beach, FL (US); Bryan C Bernier, Jupiter, FL (US); James P Downs, Hobe Sound, FL (US)

(72) Inventors: Christopher K Rawlings, Stuart, FL (US); Phillip M Redman, Pompano Beach, FL (US); Bryan C Bernier, Jupiter, FL (US); James P Downs, Hobe Sound, FL (US)

(73) Assignee: FLORIDA TURBINE TECHNOLOGIES, INC, Jupiter, FL (US)

( * ) Notice: Subject to any disclaimer, the term of this patent is extended or adjusted under 35 U.S.C. 154(b) by 299 days.

(21) Appl. No.: 15/053,008

(22) Filed: Feb. 25, 2016

Related U.S. Application Data

(60) Provisional application No. 62/182,585, filed on Jun. 21, 2015.

(51) Int. Cl.
  *G01K 17/10* (2006.01)
  *G01K 17/20* (2006.01)
  (Continued)

(52) U.S. Cl.
  CPC .............. *G01K 17/20* (2013.01); *F28D 3/00* (2013.01); *F28D 7/0008* (2013.01); *F28D 7/106* (2013.01);
  (Continued)

(58) Field of Classification Search
  CPC .............................. G01K 17/10; G01K 17/20
  See application file for complete search history.

(56) References Cited

U.S. PATENT DOCUMENTS 8,171,734 B2 * 5/2012 McMasters et al. .... B23P 6/007
  60/748

OTHER PUBLICATIONS

Eiamsa-Ard and Pongjet Promvonge ("Enhancement of Heat Transfer in a Tube with Regularly-spaced Helical Tape Swirl Generators." Solar Energy 78, No. 4 (2005): 483-94. doi:10.1016/j.solener.2004.09.021).*

(Continued)

*Primary Examiner* — Clayton E. LaBalle
*Assistant Examiner* — Leon W Rhodes, Jr.
(74) *Attorney, Agent, or Firm* — John Ryznic

(57) ABSTRACT

An apparatus and a process for experimentally determining a heat transfer coefficient of a surface which includes a duct having an outer passage for water flow and an inner passage for air flow, the two passages separated by a thin wall membrane such that the water flow establishes a datum temperature on the thin wall membrane, and where air flowing through the second passage and over the thin wall membrane surface which can include heat transfer enhancements features will be heated by the features, and where the heat transfer coefficient can be determined from the surface temperature of the thin wall membrane and the change in temperature of the air flow. The duct with the thin wall membrane and heat transfer enhancement features is produced using a plastic or metallic additive manufacture process for low cost and quit turnaround time.

29 Claims, 5 Drawing Sheets

$$k/t_{wall} \gg HTC_{air}$$

$$HTC_{water} \gg HTC_{air}$$

$$W*Cp_{water} \gg W*Cp_{air}$$

(51) Int. Cl.
*F28D 3/00* (2006.01)
*F28D 7/10* (2006.01)
*F28F 13/00* (2006.01)
*F28D 7/00* (2006.01)
*G01K 13/02* (2006.01)

(52) U.S. Cl.
CPC .............. *F28F 13/00* (2013.01); *G01K 17/10* (2013.01); *G01K 2013/024* (2013.01)

(56) References Cited

OTHER PUBLICATIONS

Freund et al ("Investigation of Local Heat Transfer Coefficients in Plate Heat Exchangers with Temperature Oscillation IR Thermography and CFD." International Journal of Heat and Mass Transfer 53, No. 19-20 (2010): 3764-781. doi:10.1016/j.ijheatmasstransfer.2010.04.027.).*

Wong et al ("Convective Heat Transfer and Pressure Losses across Novel Heat Sinks Fabricated by Selective Laser Melting." International Journal of Heat and Mass Transfer 52, No. 1-2 (2009): 281-88. doi:10.1016/j.ijheatmasstransfer.2008.06.002.).*

Rua et al ("Limitations of Additive Manufacturing on Microfluidic Heat Exchanger Components." Journal of Manufacturing Science and Engineering 137, No. 3 (Jun. 28, 2015): 034504-1-34504-5. doi:10.1115/1.4030157.).*

Dirker et al ("Convective Heat Transfer Coefficients in Concentric Annuli." Heat Transfer Engineering 26, No. 2 (Mar. 2005): 38-44. doi:10.1080/01457630590897097.).*

Nacke et al ("Theory and Experimental Validation of Cross-flow Micro-channel Heat Exchanger Module with Reference to High Mach Aircraft Gas Turbine Engines." International Journal of Heat and Mass Transfer 54, No. 5-6 (2011): 1224-235. doi:10.1016/j.ijheatmasstransfer.2010.10.028.).*

* cited by examiner

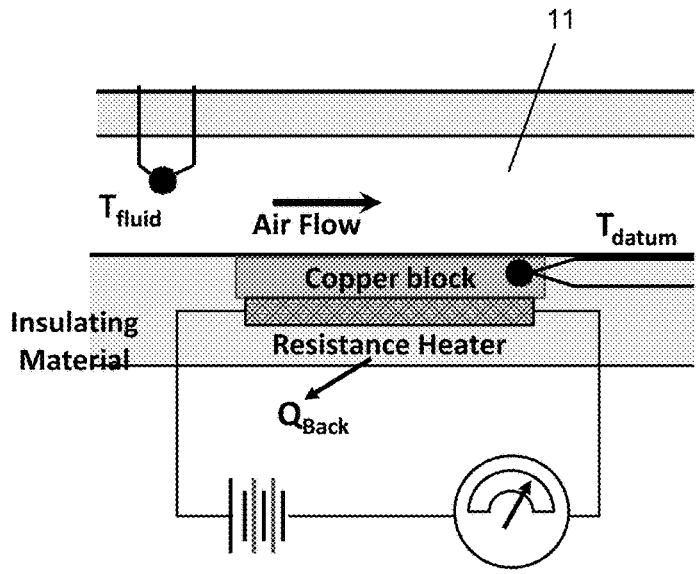
FIG 1
PRIOR ART
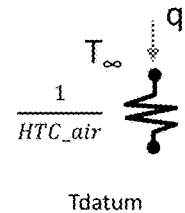
FIG 2
PRIOR ART
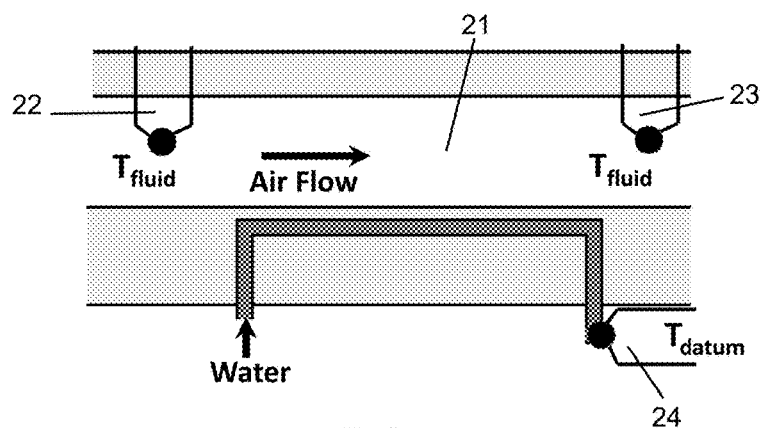
FIG 3
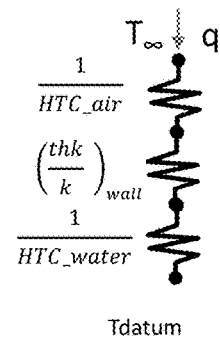
FIG 4
$k/t_{wall} \gg HTC_{air}$
$HTC_{water} \gg HTC_{air}$
$W*Cp_{water} \gg W*Cp_{air}$
FIG 5

APPARATUS AND PROCESS FOR DETERMINING A CONVECTIVE HEAT TRANSFER COEFFICIENT BETWEEN A MOVING FLUID AND A BOUNDING SURFACE

CROSS-REFERENCE TO RELATED APPLICATIONS

This application claims the benefit to U.S. Provisional Application 62/182,585 filed on Jun. 21, 2015 and entitled HEAT TRANSFER CASCADE RIG.

GOVERNMENT LICENSE RIGHTS

This invention was made with Government support under contract number FA8650-15-M-2583 awarded by Department of Defense Air Force. The Government has certain rights in the invention.

BACKGROUND OF THE INVENTION

Field of the Invention

The present invention relates generally to an apparatus and a process for experimentally determining a convective heat transfer coefficient on a much shorter time scale than current prior art testing methods allow.

Description of the Related Art Including Information Disclosed Under 37 CFR 1.97 and 1.98

As computational power continues to improve, conjugate Computational Fluid Dynamics (CFD) and heat transfer (HT) solutions are increasingly becoming a practical solution for optimization of new technologies. However, results from these analyses need to be grounded by experimental validation in order to be widely accepted. Prior art methods for experimentally determining heat transfer coefficients (HTC) are either excessive in lead time or have significant geometrical limitations. The apparatus and process of the present invention bridges the time gap between conjugate CFD/HT analysis and experimentally validated data.

The prior art method for experimentally determining a heat transfer coefficient is the steady-state HTC tests shown in FIG. 1 which includes a heated copper block in airflow setup to provide experimental data. The FIG. 1 method relies on procurement of a specially manufactured copper block and very accurate control of a resistance heater and insulation to provide a known datum temperature. The FIG. 1 apparatus is a complex assembly of heater, insulation, and copper block to create the datum temperature. FIG. 2 shows a heat flow network for the apparatus of FIG. 1.

BRIEF SUMMARY OF THE INVENTION

The HTC testing apparatus and process of the present invention leverages the heat transfer properties of a liquid such as water and additively manufactured thin walls to create a rapid and low-cost datum temperature. The HTC test apparatus and process application to external surfaces is a test method that will experimentally determine heat transfer coefficients (HTCs) on a much shorter time scale than prior art testing methods. The present invention will utilize additively manufactured plastic or metal test articles to reduce lead time and eliminate geometrical limitations of prior art testing methods. Examples of possible external testing applications include a cascaded airfoil tip, a cascaded airfoil endwall, and an airfoil pressure side or suction side configurations.

A duct includes an inner passage for a gas such as air and an outer passage for a liquid such as water with a thin wall separating the gaseous flow from the liquid flow to create a rapid and low-cost datum temperature. The thin wall or membrane is formed using a plastic or metal additive manufacturing process having a wall thickness of around 0.008 inches in order to mitigate conduction resistance. The thin wall membrane has a known thermal resistance. The thin wall is supported by pins or pedestals having fillets that minimize flow blockage and maximize structural support of the thin wall. Various heat transfer structures such as pin fins or turbulators can be formed on the surface of the thin wall using the additive manufacture process.

Water at a known temperature flows through an outer passage and produces a datum temperature on the thin wall substantially equal to the water temperature. Air flows through the outer passage and over the thin wall surface and picks up heat from the thin wall surface and any heat transfer enhancement device formed on the thin wall. The thin wall surface temperature is assumed to be equal to the water temperature. The thermal efficiency of the thin wall and any heat transfer enhancement devices will be determined by subtracting the heat transferred to the cooling air from the thin wall from the heat transfer to the cooling air determined by subtracting the outlet temperature of the air from the inlet temperature of the air.

For a blade tip or endwall, a flow section is formed for water with an external surface exposed to an air flow that is used to determine a HTC.

Convective heat transfer, often referred to simply as convection, is the transfer of heat from one place to another by the movement of fluids. Convection is usually the dominant form of heat transfer (convection) in liquids and gases. Although often discussed as a distinct method of heat transfer, convective heat transfer involves the combined processes of conduction (heat diffusion) and advection (heat transfer by bulk fluid flow).

The term convection can sometimes refer to transfer of heat with any fluid movement, but advection is the more precise term for the transfer due only to bulk fluid flow. The process of transfer of heat from a solid to a fluid, or the reverse, is not only transfer of heat by bulk motion of the fluid, but diffusion and conduction of heat through the still boundary layer next to the solid. Thus, this process without a moving fluid requires both diffusion and advection of heat, a process that is usually referred to as convection.

Convection is the transfer of thermal energy from one place to another by the movement of fluids. Although often discussed as a distinct method of heat transfer, convection describes the combined effects of conduction and fluid flow or mass exchange.

Two types of convective heat transfer may be distinguished: Free convection and forced convection.

Free or natural convection: when fluid motion is caused by buoyancy forces that result from the density variations due to variations of thermal temperature in the fluid. In the absence of an external source, when the fluid is in contact with a hot surface, its molecules separate and scatter, causing the fluid to be less dense. As a consequence, the fluid is displaced while the cooler fluid gets denser and the fluid sinks. Thus, the hotter volume transfers heat towards the cooler volume of that fluid. Familiar examples are the upward flow of air due to a fire or hot object and the circulation of water in a pot that is heated from below.

Forced convection: when a fluid is forced to flow over the surface by an external source such as fans, by stirring, and pumps, creating an artificially induced convection current.

Internal and external flow can also classify convection. Internal flow occurs when a fluid is enclosed by a solid boundary such when flowing through a pipe. An external flow occurs when a fluid extends indefinitely without encountering a solid surface. Both of these types of convection, either natural or forced, can be internal or external because they are independent of each other. The bulk temperature, or the average fluid temperature, is a convenient reference point for evaluating properties related to convective heat transfer, particularly in applications related to flow in pipes and ducts.

Convection-cooling is sometimes loosely assumed to be described by Newton's law of cooling. Newton's law states that the rate of heat loss of a body is proportional to the difference in temperatures between the body and its surroundings while under the effects of a breeze. The constant of proportionality is the heat transfer coefficient. The law applies when the coefficient is independent, or relatively independent, of the temperature difference between object and environment.

In classical natural convective heat transfer, the heat transfer coefficient is dependent on the temperature. However, Newton's law does approximate reality when the temperature changes are relatively small.

The basic and relationship for heat transfer by convection is:

$$q=hA(Ta-Tb),$$

where q is the heat transferred per unit time, A is the area of the object, h is the heat transfer coefficient, Ta is the object's surface temperature and Tb is the fluid temperature.

The convective heat transfer coefficient is dependent upon the physical properties of the fluid and the physical situation. Values of h have been measured and tabulated for commonly encountered fluids and flow of situations.

BRIEF DESCRIPTION OF THE SEVERAL VIEWS OF THE DRAWINGS

FIG. 1 shows a steady-state HTC test apparatus of the prior art.

FIG. 2 shows a heat flow network for the HTC test apparatus of FIG. 1.

FIG. 3 shows a steady-state HTC test apparatus of the present invention.

FIG. 4 shows a heat flow network for the HTC test apparatus of FIG. 3 for the present invention.

FIG. 5 shows various coefficients for the HTC apparatus of FIG. 3.

DETAILED DESCRIPTION OF THE INVENTION

Figure 6:
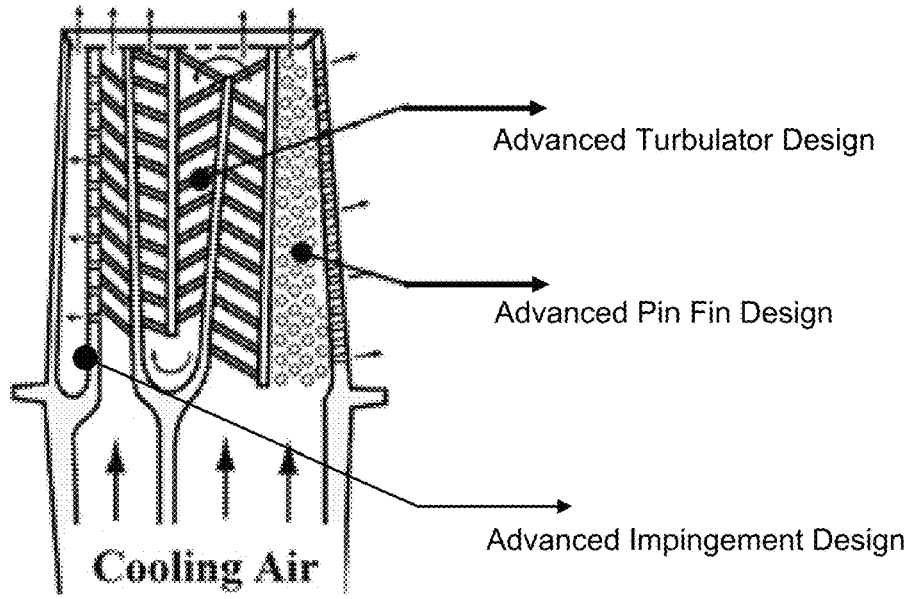
FIG. 6 shows a cutaway view of a turbine rotor blade in which the HTC apparatus and process of the present invention can be used.

The present invention is an apparatus and a process for experimentally determining a heat transfer coefficient (HTC) on a much shorter time scale than the prior art, in which the present invention leverages the heat transfer properties of water and additively manufactured thin walled test articles to reduce lead time and eliminate geometrical limitations of the prior art testing methods.

FIG. 3 shows a diagram view of the apparatus and process for experimentally determining a heat transfer coefficient of the present invention compared to the prior art apparatus of FIG. 1. The FIG. 3 embodiment leverages heat transfer properties of water and additive manufactured thin walls to create a low cost datum temperature. A compressible fluid such as air passes through one duct 21 in which a first fluid temperature probe 22 and a second downstream fluid temperature probe 23 measures a temperature of the air passing through the one duct 21. A second passage channels a second fluid such as water through a second duct having a datum temperature probe 24. A thin wall formed from an additive manufacture process is used to form a surface separating the air flow from the water flow and allow for a high heat transfer coefficient between the water and the air. Water has a high heat transfer coefficient and thus makes a great fluid to form the datum temperature on the surface of the thin wall. The inner surface of the thin wall becomes substantially equal to the temperature of the water passing through the channel due to the high heat transfer of water. Water and air are used in this embodiment, but other gases or liquids can be used. Because the thin wall is very thin, the temperature of the thin wall is assumed to be substantially equal to the temperature of the water flowing through the outer passage as measured by the temperature sensor 24. Instead of measuring the water temperature to determine the thin wall temperature, an IR camera could be used to directly measure a temperature of the thin wall surface. If an opaque duct is used, then a window must be used for the IR camera to "see" the thin wall surface.

In FIG. 3, the temperature change of the air is measured using an inlet temperature probe 22 and an outlet temperature probe 23. The air flowing through the outer passage will pick up heat from any heat transfer enhancement devices formed on the thin wall surface and from the thin wall surface itself which is at the water temperature. To get an effective convective heat transfer coefficient of the thin wall and any heat transfer enhancement features, the heat transferred from the thin wall to the cooling air is subtracted from the heat transfer to the cooling air as measured by the difference between the outlet temperature sensor 23 and the inlet temperature sensor 22. In other words, the heat picked up by the cooling air as measured by the difference of the two temperature sensors 22 and 23 minus the heat transferred from the known temperature of the thin wall as measured by the water temperature 24 is the experimentally determining a convective heat transfer coefficient of the surface of the thin wall and any heat transfer enhancement feature. This is using Newton's Law of Cooling formulae described above.

FIG. 4 shows a heat flow network for the HTC test apparatus of FIG. 3. With the water flowing through the channel on an inner side of the thin wall, the thin wall temperature becomes substantially equal to the temperature of the water flowing through due to the high heat transfer rate of the water. Thus, a datum temperature on the thin wall over which the air flows is established. The thin wall membrane has a known thermal resistance.

Figure 11:
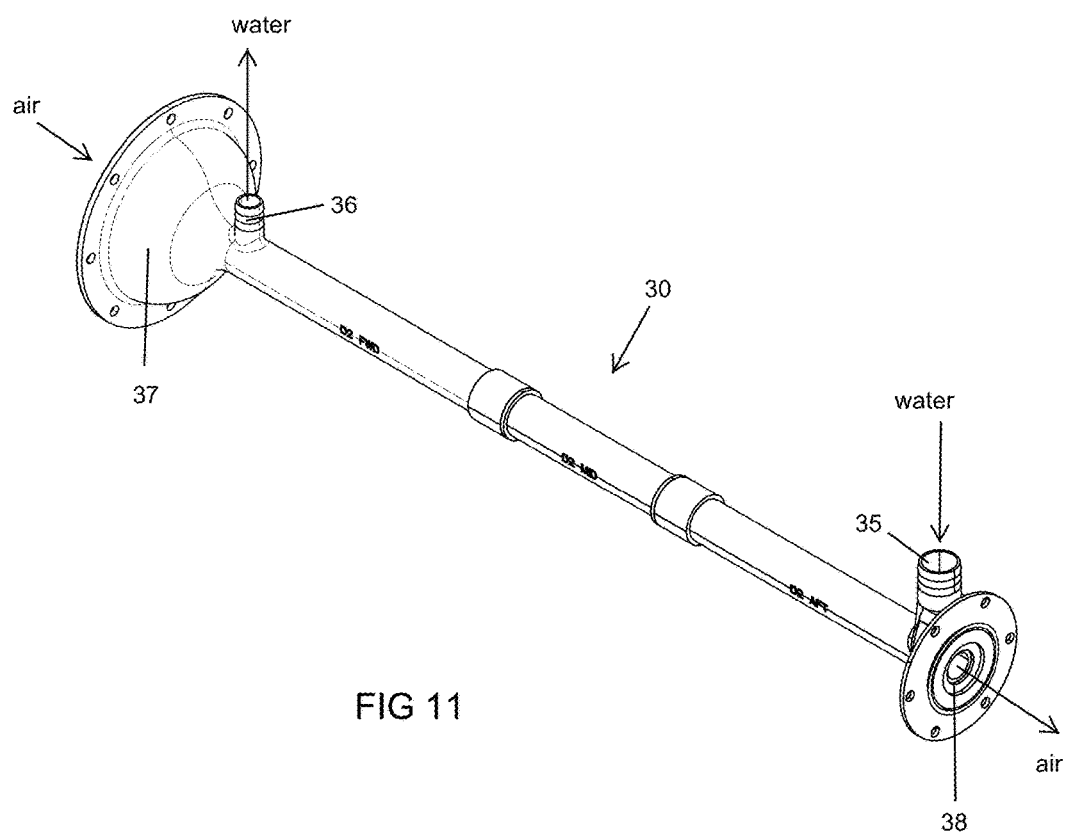
FIG. 11 shows an isometric view of a duct used to measure a heat transfer coefficient of the present invention.

FIG. 11 shows a heat transfer coefficient measuring assembly 30 of the present invention in which water flows through one duct while air flows through a second duct in which heat is transferred from one fluid to the second fluid across a thin wall formed from an additive manufacture process. The assembly 30 includes an air inlet end 37 and an air outlet end 38, and a water inlet opening 35 and a water outlet opening 36. Water and air are used as the two fluids in this embodiment of the present invention because of the heat transfer coefficient of water and because these two fluids are low cost and safe. Other fluids could be used without departing from the spirit or scope of the present invention.

Figure 12:
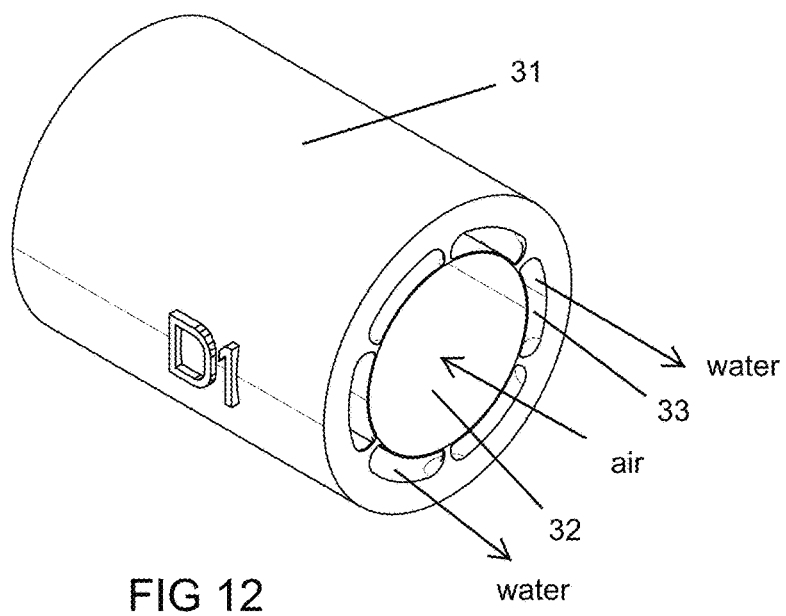
FIG. 12 shows an isometric view of section of a duct used in the apparatus and process of HTC testing of the present invention.

FIG. 12 shows a section of the duct 31 in which the water and the air flow through the assembly 30. In this embodiment, the duct 31 includes an inner channel 32 for air and an outer channel 33 for water. The inner and outer channels are concentric. The duct 31 is formed from a plastic or metallic material. The thin wall 32 in this embodiment is around 0.008 inches thickness. In the HTC assembly 30, the smooth and round duct has a length to diameter ratio (L/D) of around 20.

Figure 13:
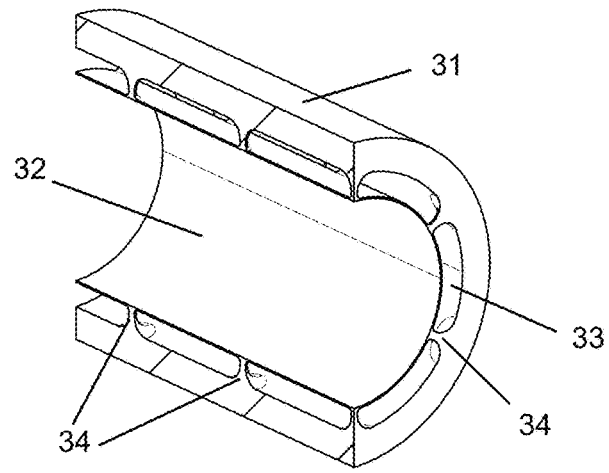
FIG. 13 shows a cutaway view of the section of the duct in FIG. 11 with pins or pedestals to support a thin inner wall of the duct.

FIG. 13 shows a cutaway view of the duct 31 in FIG. 12. The duct 31 with the thin inner wall membrane 32 is formed from an additive manufacture process in order to make the duct cheap and fast in order to provide for a low cost testing article. Yet the thin wall is thick enough to form a rigid wall. To further support the thin wall and allow for the wall to be even thinner, a number of pins or pedestals 34 are used that extend from an inner surface of the outer passage 33 to an outer surface of the thin wall that forms the inner passage 32. These pins 34 include fillets on both ends that allow for the pins to be small but strong enough to support the thin wall. Large pins would obstruct the flow of water through the outer channel 33, so the thinner the pins can be the better is the heat transfer coefficient measurement. Also, large pins would increase heat transfer from the inner thin wall to the outer wall and also decrease the results of the measurement.

Figure 7:
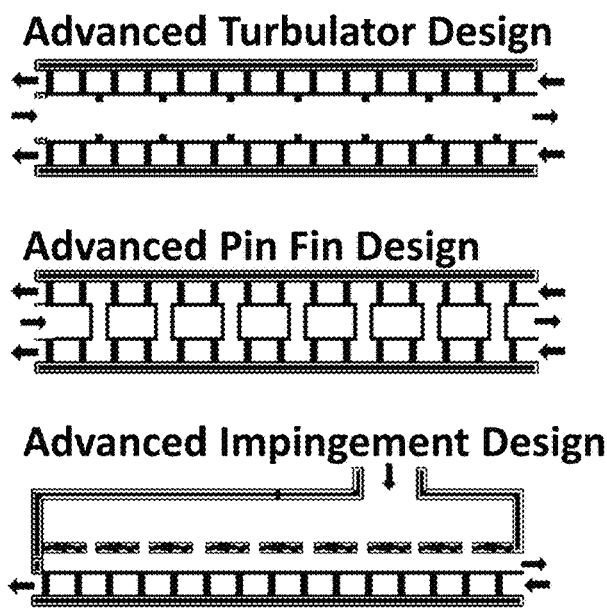
FIG. 7 shows an advanced turbulator design, and advanced pin fin design, and an advanced impingement cooling design for the turbine rotor blade of FIG. 6 produced using the HTC apparatus and process of the present invention.
Figure 9:
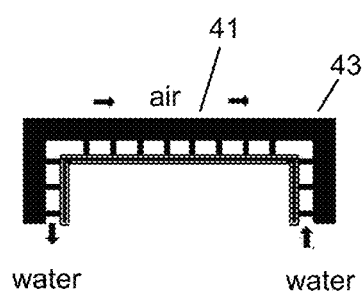
FIG. 9 shows a tip flow section of a blade tip using the apparatus and process for HTC test of the present invention.

The HTC measuring apparatus 30 can be used to determine a broad class of internal heat transfer features such as those found in an air cooled turbine airfoil shown in FIG. 6. Air cooled turbine airfoils typically include turbulators or pin fins or impingement holes to improve a heat transfer coefficient from a hot metal surface to a passing coolant such as air. FIG. 7 shows three advanced designs for the airfoil with the top figure for a turbulator design, the middle figure for a pin fin design, and the bottom figure for an impingement hole design. These various designs can be modeled in the HTC measuring apparatus 30 of the present invention. The duct like that shown in FIGS. 12 and 13 is formed from a plastic or a metal additive manufacture process in which various features such as trip strips or turbulators can be formed on a surface of the thin wall in order to experimentally measure a heat transfer rate of these features. Using the additive manufacture process to form the duct with a thin wall and the heat transfer features will provide for a low cost method to produce these ducts such that various features can be measured for heat transfer rate in short time. The duct of FIGS. 12 and 13 is one method while the structure of FIG. 9 shows another method in which a flat surface is exposed to the air flow to measure a heat transfer rate. A thicker inner wall supports a thin outer wall using the pins or pedestals with fillets just like in the rounded duct embodiment. The water passes through the inner channel around the pins or pedestals to form a datum temperature on the thin wall over which the air passes in order to measure a heat transfer rate. Whether the duct is made from plastic or metal, a low temperature water and air can be used to experimentally determine a heat transfer rate of various features with the embodiments of the present invention.

Figure 8:
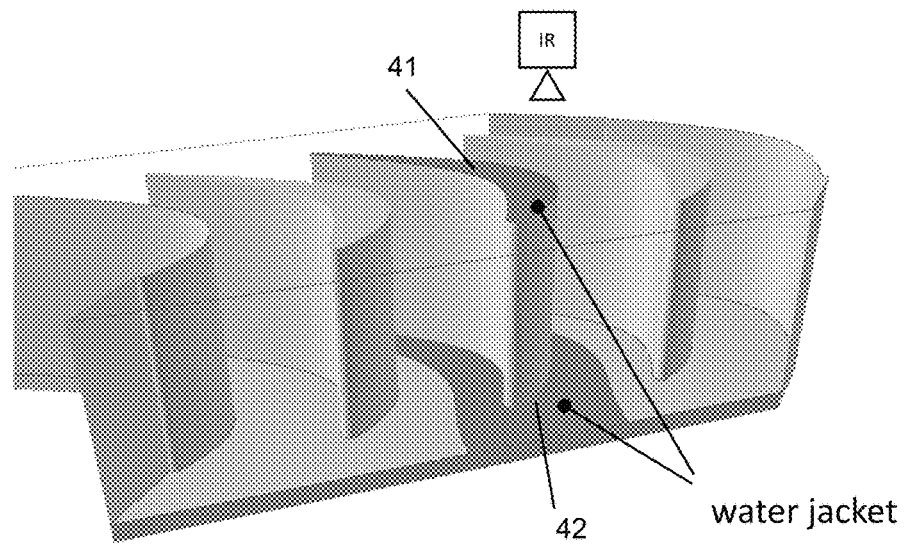
FIG. 8 shows a rotor blade assembly in which the airfoil cascade tip and endwall HTC test can be used.
Figure 10:
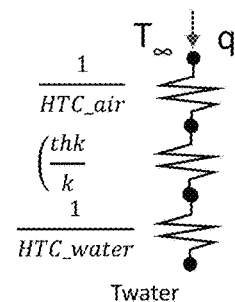
FIG. 10 shows a heat flow network for the HTC test of the tip flow section of a turbine rotor blade using the apparatus and process of the present invention.

Another use for the HTC measurement apparatus 30 is to determine a HTC for an external surface such as an airfoil cascade tip or an endwall of a stator vane assembly or rotor blade assembly in a turbine. FIG. 8 shows an airfoil cascade tip and endwall HTC test in which an IR camera captures a steady-state surface temperature which varies as a function of the HTC. Water would flow under the tip surface 41 or the endwall surface 42 identified in FIG. 8 while air would pass over the surfaces during the HTC measurement. FIG. 9 shows a cross section view through the blade tip in FIG. 8 with the water flow channel underneath the blade tip surface 41. The water channel includes pins or pedestals to support the tip and channel. A temperature sensor 43 is located on a downstream end of the tip surface 41 that measures a temperature of the air crossing over the tip surface 41. FIG. 10 shows a heat flow network for the HTC test of the tip flow section of a turbine rotor blade of FIGS. 8 and 9.

We claim the following:

1. A process for experimentally determining a heat transfer coefficient of a surface comprising the steps of:
    forming a duct with a first fluid passage and a second fluid passage separated by a thin wall membrane;
    passing water through the first fluid passage to establish a datum temperature of the thin wall membrane;
    passing air through the second fluid passage to transfer heat from the thin wall membrane to the air; and,
    determining a heat transfer coefficient of the surface by measuring a difference between the air inlet and the air outlet of the second fluid passage and a temperature of the thin wall membrane.

2. The process for experimentally determining a heat transfer coefficient of claim 1, and further comprising the step of:
    Measuring the temperature of the thin wall membrane includes measuring a temperature of the water flowing through the first fluid passage.

3. The process for experimentally determining a heat transfer coefficient of claim 1, and further comprising the step of:
    Measuring the temperature of the thin wall membrane includes measuring a temperature of a surface of the thin wall membrane using an IR camera.

4. The process for experimentally determining a heat transfer coefficient of claim 1, and further comprising the step of:
    forming the duct using an additive manufacture process.

5. The process for experimentally determining a heat transfer coefficient of claim 1, and further comprising the step of:
    forming the duct with a plurality of heat transfer enhancement features using an additive manufacture process.

6. The process for experimentally determining a heat transfer coefficient of claim 5, and further comprising the step of:
the heat transfer enhancement features include turbulators or pin fins or impingement holes.

7. The process for experimentally determining a heat transfer coefficient of claim 1, and further comprising the step of:
forming the thin wall membrane with a plurality of heat transfer enhancement features on a surface in the second fluid passage.

8. The process for experimentally determining a heat transfer coefficient of claim 1, and further comprising the step of:
forming the duct as a round duct with the second fluid passage concentric with and outside of the first fluid passage.

9. The process for experimentally determining a heat transfer coefficient of claim 8, and further comprising the step of:
forming a fillet on each of the plurality of pedestals to rigidly support the thin wall membrane.

10. The process for experimentally determining a heat transfer coefficient of claim 1, and further comprising the step of:
forming a plurality of pedestals extending across the first fluid passage to support the thin wall membrane.

11. An apparatus for experimentally determining a heat transfer coefficient comprising:
a duct having a first fluid passage and a second fluid passage with a thin wall membrane separating the first fluid passage from the second fluid passage;
a plurality of pedestals extending across the first fluid passage to support the thin wall membrane;
a first fluid inlet and outlet for the first fluid passage;
a second fluid inlet and outlet for the second fluid passage;
a first temperature sensor at an inlet to the second fluid passage to measure a temperature of the second fluid at the inlet;
a second temperature sensor at an outlet of the second fluid passage to measure a temperature of the second fluid at the outlet;
a third temperature sensor to measure a temperature of the thin wall membrane; and,
a computer to determine a heat transfer coefficient of an inner surface of the thin wall membrane based on a difference between the first and second temperature sensors and the temperature of the third sensor.

12. The apparatus for experimentally determining a heat transfer coefficient of claim 11, and further comprising:
the plurality of pedestals each includes a fillet to form a rigid support for the thin wall membrane.

13. The apparatus for experimentally determining a heat transfer coefficient of claim 11, and further comprising:
the thin wall membrane includes a plurality of heat transfer enhancement surfaces on a side of the second fluid passage.

14. The apparatus for experimentally determining a heat transfer coefficient of claim 11, and further comprising:
the plurality of heat transfer enhancement surfaces includes turbulators or pin fins or impingement holes.

15. The apparatus for experimentally determining a heat transfer coefficient of claim 11, and further comprising:
the duct with the second fluid passage has a length to diameter ratio of 20.

16. The apparatus for experimentally determining a heat transfer coefficient of claim 11, and further comprising:
the thin wall membrane has a thinness of less than or equal to 0.008 inches.

17. The apparatus for experimentally determining a heat transfer coefficient of claim 11, and further comprising:
the thin wall membrane is thin enough such that water flowing through the first passage will produce a temperature of the thin wall membrane substantially equal to the temperature of the water.

18. The apparatus for experimentally determining a heat transfer coefficient of claim 11, and further comprising:
the temperature measuring device is an inlet temperature sensor for the air and an outlet temperature sensor for the air and a water temperature sensor.

19. The apparatus for experimentally determining a heat transfer coefficient of claim 11, and further comprising:
the temperature measuring device is an IR camera to measure a surface temperature of the thin wall membrane in the second fluid passage.

20. A process for experimentally determining a heat transfer coefficient of a surface comprising the steps of:
forming a thin wall membrane with first surface and an opposed second surface with a heat transfer enhancement feature;
passing a non-compressible fluid having a non-compressible fluid temperature along the first surface of the thin wall membrane such that a temperature of the thin wall membrane is substantially equal to the non-compressible fluid temperature;
passing a compressible fluid along the second surface;
measuring a temperature gain of the compressible fluid along the second surface;
determining a temperature gain of the compressible fluid passing along the second surface from heat transfer resulting from the non-compressible fluid passing through the thin wall membrane; and,
subtracting the heat transfer from the non-compressible fluid passing through the thin wall membrane from the temperature gain of the compressible fluid along the second surface to determine a heat transfer coefficient of the second surface with the heat transfer enhancement feature.

21. The process for experimentally determining a heat transfer coefficient of claim 20, and further comprising the step of:
the non-compressible fluid is water; and,
the compressible fluid is air.

22. The process for experimentally determining a heat transfer coefficient of claim 20, and further comprising the step of:
the heat transfer enhancement feature is a turbulator or a pin fin or an impingement hole.

23. The process for experimentally determining a heat transfer coefficient of claim 20, and further comprising the step of:
forming the thin wall membrane with the heat transfer enhancement feature from an additive manufacture process.

24. The process for experimentally determining a heat transfer coefficient of claim 20, and further comprising the steps of:
the step of determining a temperature gain of the compressible fluid passing along the second surface from heat transfer resulting from the non-compressible fluid passing through the thin wall membrane includes measuring a temperature of the non-compressible fluid passing along the first surface; and, estimating a heat transfer rate through the thin wall membrane.

25. The process for experimentally determining a heat transfer coefficient of claim 20, and further comprising the step of:

the step of determining a temperature gain of the compressible fluid passing along the second surface from heat transfer resulting from the non-compressible fluid passing through the thin wall membrane includes measuring a surface temperature of the thin wall membrane using an IR camera.

26. The process for experimentally determining a heat transfer coefficient of claim 20, and further comprising the step of:

forming a plurality of support structures on the thin wall membrane extending into the non-compressible fluid flow to support the thin wall membrane.

27. The process for experimentally determining a heat transfer coefficient of claim 20, and further comprising the step of:

determining the heat transfer coefficient of the heat transfer enhancement feature using only three temperature measurements that include a temperature of the non-compressible fluid and an inlet temperature of the compressible fluid and an outlet temperature of the compressible fluid.

28. The process for experimentally determining a heat transfer coefficient of claim 20, and further comprising the step of:

forming the first and second surfaces as a circular duct having an outer annular passage for the non-compressible fluid and an inner annular passage for the compressible fluid with the thin wall membrane from an additive manufacture process.

29. The process for experimentally determining a heat transfer coefficient of claim 20, and further comprising the step of:

forming the thin wall membrane with a thinness of 0.008 inches.

* * * * *